United States Patent
Lee (10) Patent No.: US 8,041,878 B2
(45) Date of Patent: Oct. 18, 2011

(54) FLASH FILE SYSTEM

(75) Inventor: Jinaeon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1501 days.

(21) Appl. No.: 10/390,667

(22) Filed: Mar. 19, 2003

(65) Prior Publication Data

US 2004/0186946 A1 Sep. 23, 2004

(51) Int. Cl.
*G06F 12/00* (2006.01)
*G06F 12/10* (2006.01)

(52) U.S. Cl. ............. 711/103; 711/206; 711/E12.008; 711/E12.014; 711/E12.019

(58) Field of Classification Search ............ 711/103, 711/146, 156, 118, 139, 159; 365/221, 189, 365/185

See application file for complete search history.

(56) References Cited

U.S. PATENT DOCUMENTS

| | | | |
|---|---|---|---|
| 5,602,987 A | 2/1997 | Harari et al. | 714/8 |
| 6,016,530 A * | 1/2000 | Auclair et al. | 711/6 |
| 6,145,051 A | 11/2000 | Estakhri et al. | 711/163 |
| 6,275,436 B1 * | 8/2001 | Tobita et al. | 365/221 |
| 2003/0033573 A1 * | 2/2003 | Tamura et al. | 714/763 |

* cited by examiner

*Primary Examiner* — Mardochee Chery
(74) *Attorney, Agent, or Firm* — Harness, Dickey & Pierce, P.L.C.

(57) ABSTRACT

The flash file system includes a flash memory and a subsystem interfacing between the flash memory and a host system. The subsystem includes a hierarchical structure of a host system interface, cache memory system, flash translation layer unit and a flash memory interface. The host system interface interfaces with the host system. The cache memory system has a storage capacity of a predetermined number of data units and stores data for transfer to and from the host system via the host system interface. The flash translation layer unit maps a logical address received from the host system via the host system interface and the cache memory into a physical address of the flash memory. The flash memory interface interfaces with the flash memory to transfer data to the flash memory from the cache memory system based on the physical address received from the flash translation layer unit and to transfer data from the flash memory to the cache memory system based on the physical address received from the flash translation layer unit.

30 Claims, 11 Drawing Sheets

Physical Address Table

62

| Log. Ad. | | | |
|---|---|---|---|
| 0 | A | Physical Address | |
| 1 | A | Physical Address | |
| ⋮ | | | |
| n-1 | A | Physical Address | |

72

Logical Address Table

| Phy. Ad. | | | | |
|---|---|---|---|---|
| 0 | A | E | Logical Address | Misc |
| 1 | A | E | Logical Address | Misc |
| ⋮ | | | | |
| n-1 | A | E | Logical Address | Misc |

74

Cache Table

64

| Entry | | | | |
|---|---|---|---|---|
| 0 | Logical Address | A | E | Physical Address |
| 1 | Logical Address | A | E | Physical Address |
| ⋮ | | | | |
| c-1 | Logical Address | A | E | Physical Address |

<Before>

1102
| logical addr. | A | physical addr. |
|---|---|---|
| #0 | 1 | #31 |
| ... | ... | ... |

1104
| physical addr. | A | E | logical addr. | Misc |
|---|---|---|---|---|
| ... | ... | ... | ... | ... |
| #31 | 1 | 0 | #0 | ... |
| #32 | 0 | 1 | #1 | ... |
| ... | ... | ... | ... | ... |

<After>

1106
| logical addr. | A | physical addr. |
|---|---|---|
| #0 | 1 | #32 |
| ... | ... | ... |

1108
| physical addr. | A | E | logical addr. | Misc |
|---|---|---|---|---|
| ... | ... | ... | ... | ... |
| #31 | 0 | 0 | #0 | ... |
| #32 | 1 | 0 | #0 | ... |
| ... | ... | ... | ... | ... |

FIG. 13

FLASH FILE SYSTEM

BACKGROUND OF THE INVENTION

The present invention relates to the field of electronic storage. More particularly, the invention is directed towards flash memory and a file system therefore. Flash memory is becoming more and more widely used because information stored in a flash memory is maintained even when power is no longer supplied to the flash memory. Furthermore, flash memory is a solid state device and is extremely useful for portable devices such as portable computers, digital still cameras, etc. A flash memory consumes much less power and is not susceptible to shocks as are many types of magnetic storage media such as hard disks.

There are two types of flash memory, a NAND type and a NOR type. The NOR type of flash memory provides for random access, but is expensive to manufacture. The NAND type of flash memory, on the other hand, is relatively inexpensive but suffers from an inefficient write operation.

When a portion of the flash memory has previously been programmed (i.e., written) with data, reprogramming (i.e., over-writing) that portion of the flash memory with data requires performing an erase operation before the data can be written. Besides being inefficient, this erase before write, or EBW, process means the flash memory has a limited lifetime.

Flash memory is a transistor memory cell that is programmable through hot electron, source injection, or tunneling and erasable through the Fowler-Nordheim tunneling mechanism. The programming and erasing of such a memory cell requires current to pass through the dielectric surrounding a floating gate. Because of this, such types of memory have a finite number of erase-write cycles because the dielectric eventually deteriorates.

Several techniques have been proposed to mitigate the EBW problem. One method is to use a logical or virtual addressing scheme wherein, for example, a host system supplies a logical address for a read or a write operation to the flash memory that is then mapped into a physical address of the flash memory. During this process, data is preferably written into free physical space of the flash memory so that an erase operation does not need to be performed. This techniques involves maintaining a mapping table of logical addresses to physical addresses. Conventionally, this mapping operation requires both a translation and mapping operation. For example, a host device will supply logical addresses based on a 4 KB unit of data called a cluster. Stated another way, the file system of the host device, such as a computer, has a cluster size format. However, the physical addresses of the flash memory are established based on a unit of data that can be erased at one time, generally 16 KB or more, and the file system used by the controller for the flash memory in conventional flash memory systems is based on the physical structure of the flash memory. As a result, to map the logical address to the physical address, also requires a translation of the host device file system into the file system for the flash memory.

The mapping information for the flash memory must be maintained even when power is no longer supplied to the device incorporating the flash memory. Storing this information in the flash memory itself reduces the storage capacity of the flash memory, and can also result in configurations of the flash memory which are difficult to manage.

Additionally, the controller for the flash memory in these conventional systems includes an interface structure that so closely integrates the host interface functionality with the flash memory interface functionality that a change in the flash memory, a change in the host interface, or a change in a portion of the interface structure requires a complete redesign of the flash memory system.

SUMMARY OF THE INVENTION

The flash file system according to the present invention has a hierarchical structure that permits redesigning a host system, flash memory or a portion of the flash file system without completely redesigning the flash file system. Accordingly, the flash file system of the present invention is extremely flexible and readily adaptable to specific applications.

In an exemplary embodiment, the flash file system includes a flash memory and a flash memory subsystem. The flash memory subsystem includes a host system interface, a cache memory system, a flash translation layer unit and a flash memory interface. The host system interface interfaces with the host system. The cache memory system has a storage capacity of a predetermined number of data units and stores data for transfer to and from the host system via the host system interface. The flash translation layer unit maps a logical address received from the host system via the host system interface and the cache memory into a physical address of the flash memory. The flash memory interface interfaces with the flash memory to transfer data to the flash memory from the cache memory system based on the physical address received from the flash translation layer unit and to transfer data from the flash memory to the cache memory system based on the physical address received from the flash translation layer unit.

In an exemplary embodiment, the cache memory system stores data for transfer to the flash memory according to logical addresses used by the host system and outputs data for transfer to the host system without accessing the flash memory when data requested by the host system is resident in the cache memory system. In a further exemplary embodiment, the cache memory system uses the same file system as the host system. Consequently, no translation of a logical address received from the host system is required at the cache memory system.

In a further exemplary embodiment, the flash translation layer unit uses the same file system as the host system. Consequently, in mapping a logical address received by the host system into a physical address of the flash memory, the flash translation layer unit (FTL) does not need to translate the logical address of the host system from one mapping format or file system into another. More specifically, the file system and mapping format of the flash memory subsystem is based on the same data unit size as the file system and mapping format of the host system. Accordingly, the mapping format is independent of a physical structure of the flash memory. In one exemplary embodiment the file system and mapping format are based on a 4 KB cluster.

In another exemplary embodiment, the flash translation layer unit includes a physical address table and a logical address table. The physical address table is indexed by logical addresses, indicates an associated physical address for each logical address, and indicates whether the logical address and physical address association is valid. The logical address table is indexed by physical addresses, indicates an associated logical address for each physical address, indicates whether the physical address and logical address association is valid, and indicates for each physical address whether this portion of the flash memory is erased. The logical address table further includes the miscellaneous field that stores miscellaneous data such as error correction code (ECC) data, etc.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION

Figure 1:
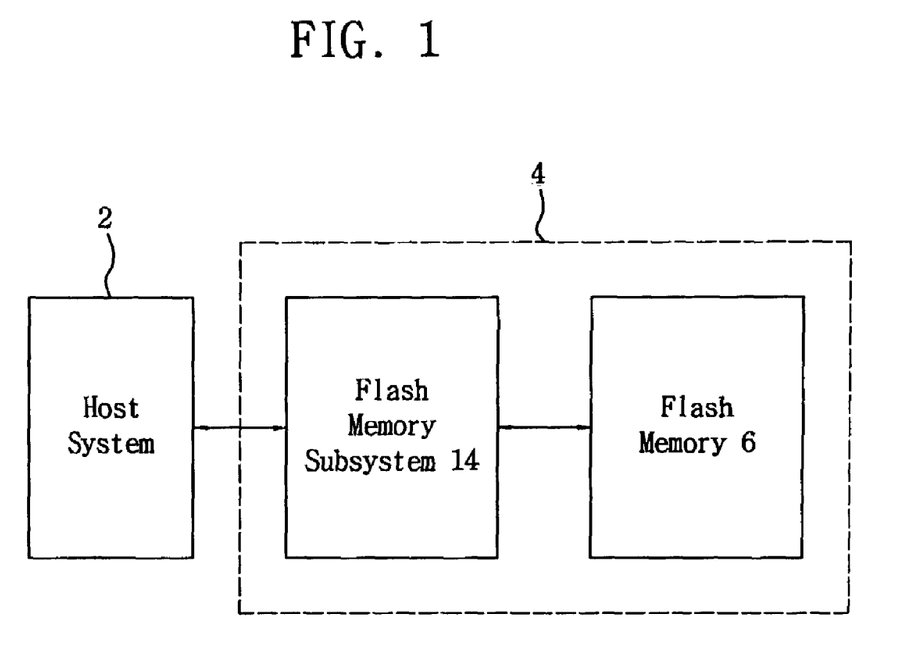
FIG. 1 illustrates a host system connected to a flash file system according to an exemplary embodiment of the present invention.

FIG. 1 illustrates a host system 2 connected to a flash file system 4 according to an exemplary embodiment of the present invention. As shown, the flash file system includes a flash memory 6 connected to a flash memory subsystem 14. The flash memory 6 is a NAND type flash memory. The flash memory subsystem 14 serves as an interface between the host system 2 and the flash memory 6.

Figure 2:
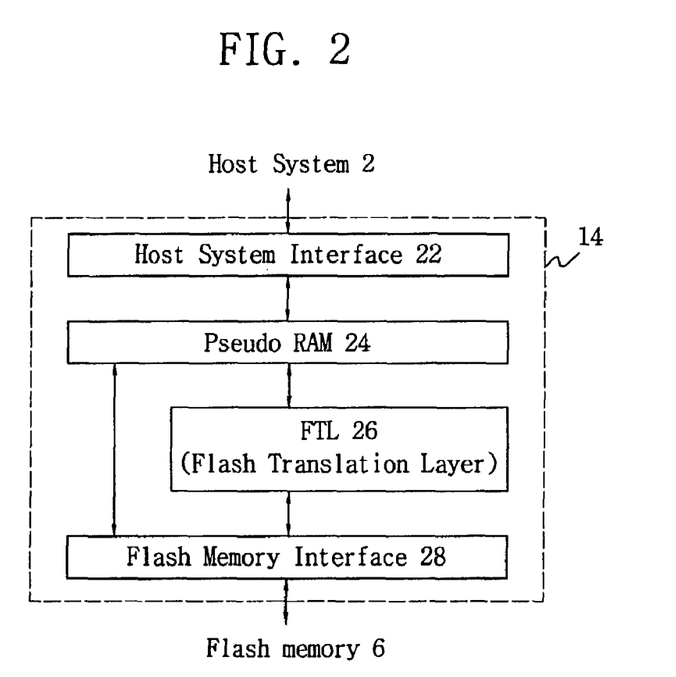
FIG. 2 illustrates the flash memory subsystem of FIG. 1 in greater detail.

FIG. 2 illustrates the flash memory subsystem 14 in greater detail. As shown, the flash memory subsystem 14 has a hierarchical structure. As a result, redesign of the flash memory 6 or host system 2 does not require an entire redesign of the flash memory subsystem 14. Namely, as shown, the flash memory subsystem 14 includes a host system interface 22 that interfaces with the host system 2. A pseudo RAM 24 connected to the host system interface 22 operates as a form of cache, and temporarily stores data being written into and read from the flash memory 6. A flash translation layer unit (FTL) 26 maps a logical address received from the host system 2 into a physical address of the flash memory 6. A flash memory interface 28 interfaces with the flash memory by writing data received from the pseudo RAM 24 into the flash memory 6 at addresses supplied by the FTL 26, and reading data from the flash memory 6 at addresses supplied by the FTL 26.

Each layer of the flash memory subsystem 14 will now be described in detail.

Host System Interface

The host system interface 22 interfaces with the host system 2 according to an interface protocol. Many well known protocols exist. The present invention is applicable to both parallel protocols such a compact flash and serial protocols such as the multimedia card (MMC), secure digital (SD), memory stick, etc. Also, a more general purpose interface could be used.

Figure 3:
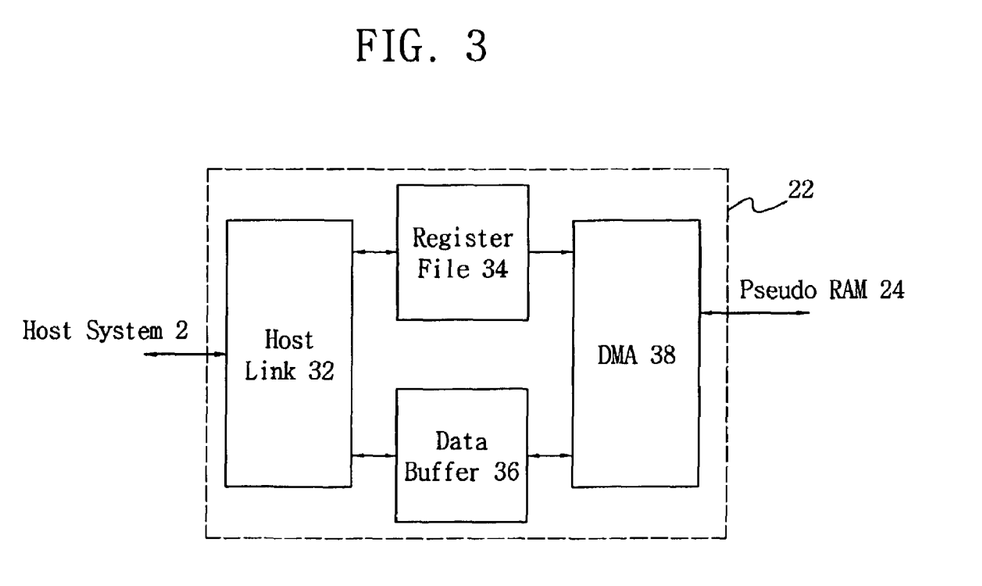
FIG. 3 illustrates the host system interface in FIG. 2 in greater detail.

FIG. 3 illustrates an exemplary embodiment of the host system interface 22 according to the present invention. As shown, a host link 32 communicates with the host system 2. The host link 32 includes a specific host interface timing protocol. It is possible to support various interface protocols using host system interface 22 according to the present invention simply by redesigning the host link 32. As is well known, a register file 34 stores status and operational parameters of the host system interface 22. Data being transferred to and from the host system 2 is temporarily stored in the host system interface 22 by a data buffer 36, which is connected to the host link 32 and a direct memory access (DMA) 38. The DMA is also connected to the register file 34, and transmits input/output requests from the host system 2 to the lower layers of the flash memory subsystem 14. Specifically, the DMA 38 transmits a write request and related data stored in the data buffer 36 to the pseudo RAM 24 or reads data from the pseudo RAM 24 according to a read request and stores that data in the data buffer 36.

In one exemplary embodiment, the DMA 38 transfers data at 512 bits×ns (where ns=1, 2, 4, 8, 16) to support a host interface scheme derived from conventional magnetic disk storage systems. To increase the data transmission efficiency between the DMA 38 and the host link 32, the data buffer 36 has a structure of n×bus_width, where n is the FIFO depth of the data buffer 36 and is equal to 2, 4, 8, 16, . . . , and the bus width is equal to 8, 16, 32, 64, . . . .

Pseudo RAM 24

Figure 4:
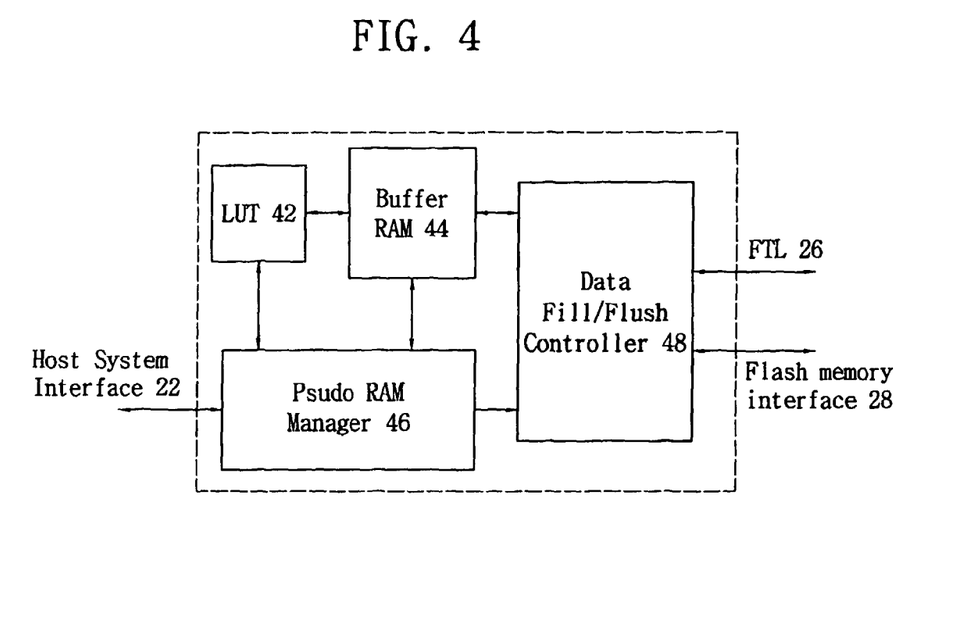
FIG. 4 illustrates the pseudo RAM of FIG. 2 in greater detail.

The pseudo RAM 24 permits the host system interface 22 to access data in a mode similar to a typical RAM. As shown in FIG. 4, the pseudo RAM 24 includes a buffer RAM 44 that stores the most current data having been read from or written into the flash memory 6. A lookup table (LUT) 42 associated with the buffer RAM 44 maintains a directory of the data stored in the buffer RAM 44. When data is written to the flash memory 6 or read from the flash memory 6, a data fill/flush controller 48 serves as an interface between the buffer ram 44 and the lower layers of the flash memory subsystem 14. A pseudo RAM manager 46 controls the operation of the LUT 42, the buffer RAM 44, and the data fill/flush controller 48 based on read and write requests received from the host system interface 22.

Figure 5:
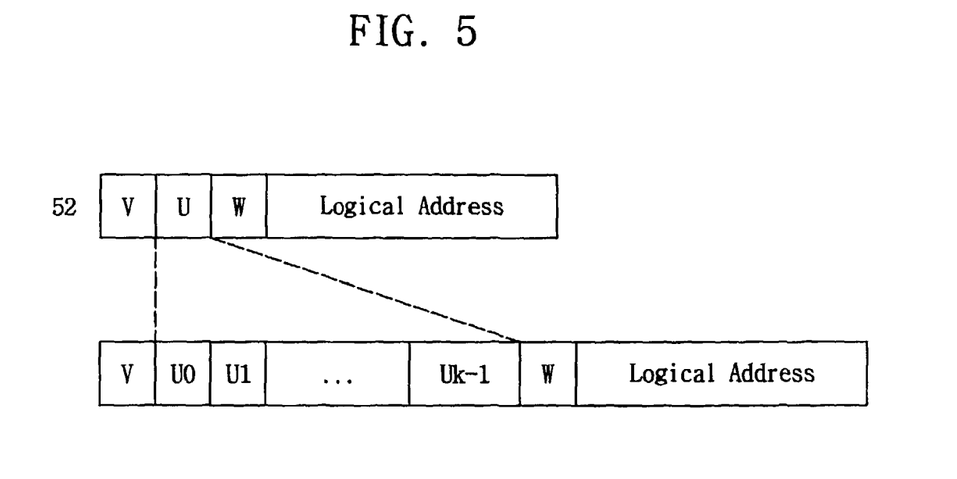
FIG. 5 illustrates the field structure of the directory entries stored in the look-up table (LUT) in FIG. 4.

FIG. 5 illustrates the field structure of the directory entries stored in the LUT 42. The LUT 42 includes an entry 52 for each unit of data stored in the buffer RAM 44. In an exemplary embodiment of the present invention, the unit of data stored in the buffer RAM 44 is the same as the unit of data forming the basis for the file system in the host system 2. As will be appreciated from this and the following description, the flash memory subsystem 14 employs a file system based on the same unit of data as the file system of the host system 2. For example, in an exemplary embodiment of the present invention, the host system 2 has a file system based on a unit of data called a cluster, which is 4 KB. Accordingly, the buffer RAM 44 stores data in units of clusters, and the LUT 42 includes an entry 52 for each cluster. As will be discussed in more detail below, because the file system of the buffer RAM 44 matches the file system used by the host system 2, logical addresses supplied by the host system 2 to the flash memory subsystem 14 can be used to directly read and write data from and to the buffer RAM 44 without translation. Stated another way, the mapping format of the flash memory subsystem 14 is the same as that of the host system 2. Accordingly, it will be appreciated that the mapping format and file system of the flash memory subsystem 14 are independent of the physical structure of the flash memory 6.

Returning to FIG. 5, at entry 52 in the LUT 42 includes the logical address of the corresponding data unit in the buffer RAM 44, a validity field V, an updated field U, and a write field W. The validity field V indicates whether or not the data corresponding to the logical address of the entry 52 is valid. The updated field U indicates whether the data in the buffer RAM has been updated by the host system 2. In an exemplary embodiment, the updated field is comprised of k subfields U0-Uk−1, where k represents a sub-unit of data. For example, the flash memory 6 is typically organized into pages or sectors of 512 bytes each. Dividing the size of the data units stored in the buffer RAM 44 by the page size results in k sub-units of data. Returning to our example of a cluster (4 KB) as the data unit stored in the buffer RAM 44, and assuming a flash memory 6 organized into pages of 512 bytes each, the updated field U will be comprised of 8 (i.e., k=8) subfields U0-U7. Each updated subfield U0-U7 will indicate whether or not that sub-unit of data stored in the buffer RAM 44 has been updated.

The write field W indicates whether or not all of the sub-units within the unit of data stored in the buffer RAM 44 have been updated. Assuming the example given above, when U0-Uk−1 are all set to 1 indicating that the corresponding sub-unit has been updated, the write field W is also set to 1. As will be discussed in more detail below, the pseudo RAM manager 46 monitors the write field W to determine when to write data from the buffer RAM 44 into the flash memory 6.

Figure 6:
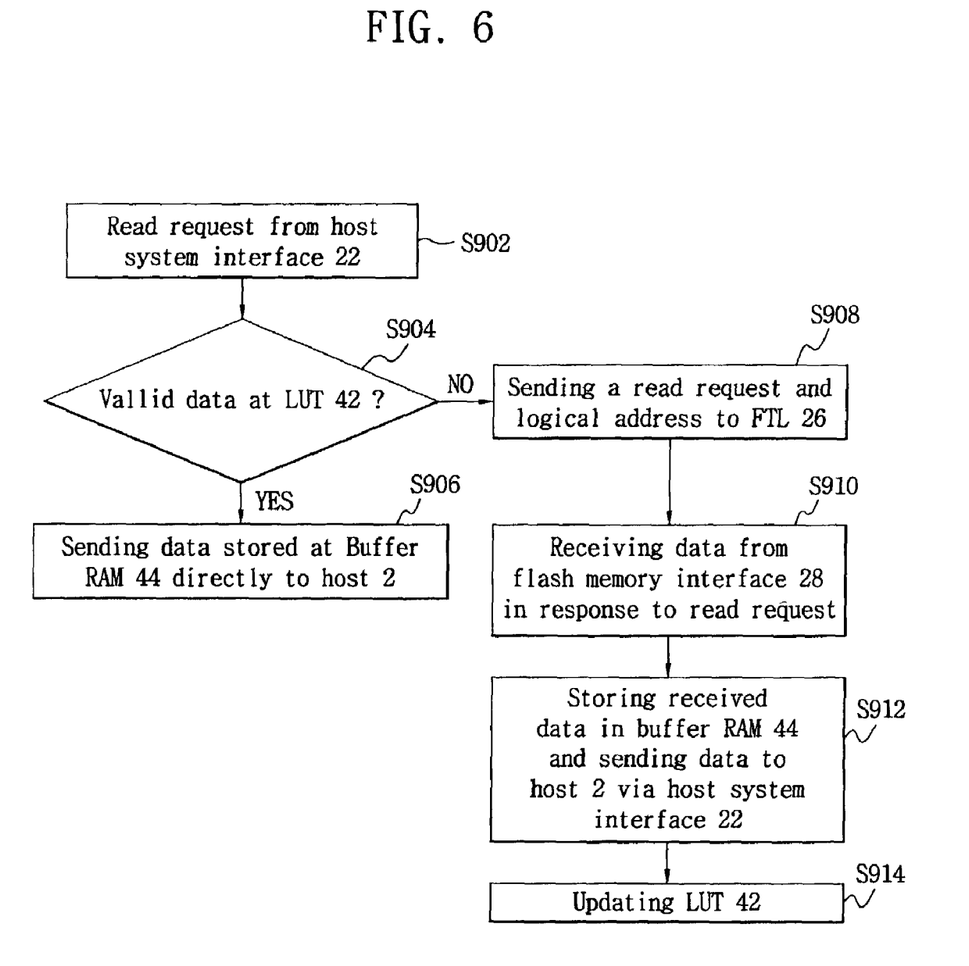
FIG. 6 illustrates a flow chart of the read process performed by the pseudo RAM of FIG. 4.

FIG. 6 illustrates the operation of the pseudo RAM 24 when a read request is received from the host system interface 22. As shown, in step S902, the pseudo RAM manager 46 receives a read request from the host system interface 22. The read request, which originated from the host system 2, includes a logical address. In step S904, the pseudo RAM manager 46 accesses the LUT 42 and determines whether or not the LUT 42 includes (i) an entry 52 having the same logical address as the received logical address and (ii) that the validity field V for that logical address indicates the corresponding data stored in the buffer RAM 44 is valid.

If the pseudo RAM manager 46 determines valid data is stored in the buffer RAM 44, then in step S906, the pseudo RAM manager 46 reads the valid data from the buffer RAM 44, and sends this data directly to the host system 2 via the host system interface 22. Accordingly, in this manner the pseudo RAM 24 operates as a form of cache with respect to the flash memory 6, and a much more efficient read operation can take place.

If in step S904, the pseudo RAM manager 46 is unsuccessful in finding a valid entry 52 for the received logical address, then in step S908, the pseudo RAM manager 46 controls the data fill/flush controller 48 to issue a read request through the FTL 26. The read request will include the logical address received from the host system interface 22. As will be described in detail below, the FTL 26 maps the logical address into a physical address of the flash memory 6, and supplies this physical address along with the read request to the flash memory interface 28. The flash memory interface 28 will read data from the flash memory 6 based on the received physical address and read request, and return the read data to the data fill/flush controller 48. Accordingly, in step S910, the data fill/flush controller 48 receives data from the flash memory interface 28 in response to the read request. The received data is then stored in the buffer RAM 44 and sent to the host system 2 via the host system interface 22 in step S912.

In storing the received data in the buffer RAM 44, the pseudo RAM manager 46 updates the LUT 42 in step S914 to include an entry 52 for the newly stored data. The entry 52 will include the logical address received with the read request, the validity V will be set to indicate valid data (e.g., V=1), and the update field U and write field W will be set to indicate no updated data (e.g., U0-Uk−1=0 and W=0).

Figure 7:
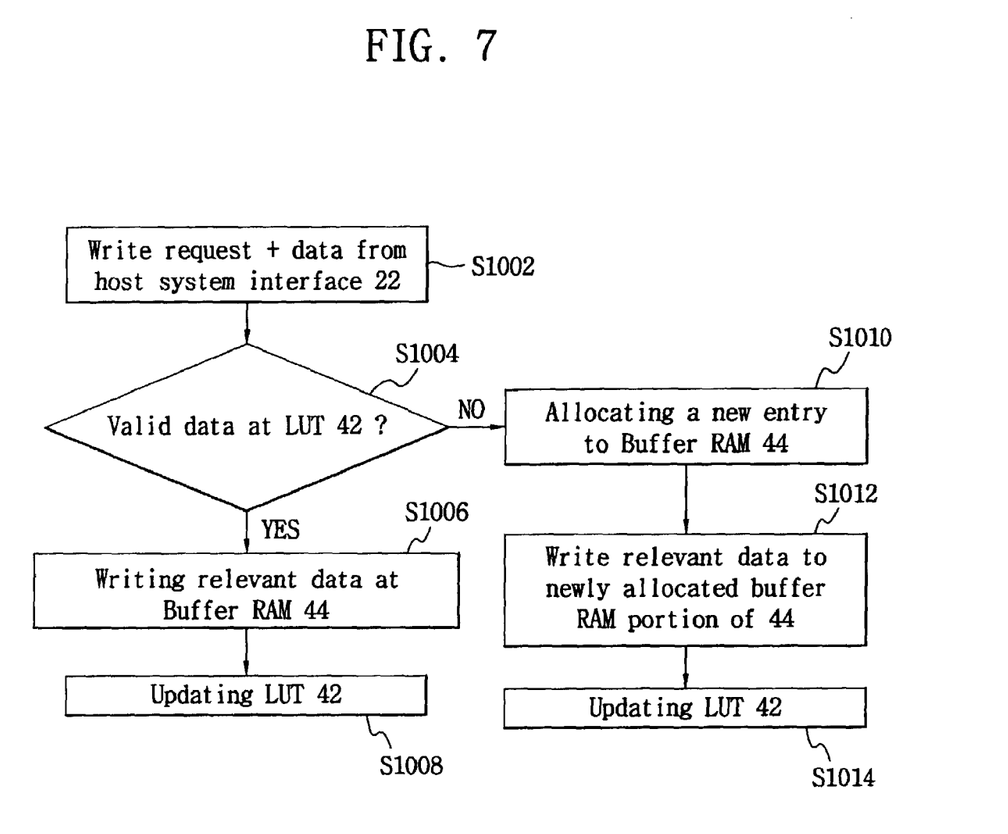
FIG. 7 illustrates a flow chart of the write process performed by the pseudo RAM of FIG. 4.

Next, the operation of the pseudo RAM 24 when a write request is received from the host system interface 22 will be described with respect to FIG. 7. As shown in step S1002, the pseudo RAM manager 46 receives a write request and data from the host system 2 via the host system interface 22. Included in the write request is a logical address for writing the received data. In step S1004, the pseudo RAM manager 46 accesses the LUT 42 to determine whether or not an entry 52 in the LUT 42 has the same logical address as the received logical address and whether the validity field V for the that logical address indicates valid data. If the pseudo RAM manager 46 finds a valid logical address matching the received logical address, then in step S1006, the pseudo RAM manager 46 writes the received data into the buffer RAM 44, and updates the corresponding update subfields of the entry 52 in step 1008.

If in step S1004, a valid logical address matching the received logical address is not found, then in step S1010, the pseudo RAM manager 46 creates a new entry in the buffer RAM 44, and writes the received data in the buffer RAM 44 in step S1012. Creating a new entry in the buffer RAM 44 involves locating an entry 52 in the LUT 42 that is invalid. When the flash memory subsystem 14 initially begins operation, each entry 52 in the LUT 42 is initialized as invalid. However, over time the LUT 42 may include all valid entries. When this occurs and a new entry 52 needs to be created, the LUT 42 locates an entry 52 that has no update subfields set, and writes the data into the buffer RAM 44 corresponding to this entry 52. If (i) no invalid entry exists and (ii) no valid and non-updated entries exist, then the buffer RAM manager 46, instructs the data fill/flush controller 48 to flush a portion or all of the buffer RAM 44. This means writing the contents of the buffer RAM 44 being flushed into the flash memory 6. The entries 52 corresponding to the flushed data are then set as invalid entries such that the write operation can be performed. In step S1014, the pseudo RAM manager 46 updates the LUT 42 to reflect the new entry 52 for the newly written data. The new entry 52 will include the logical address received with the write request, the validity bit will be set to indicate valid data, and the update field will be set to indicate updated data. If an entire, for example, cluster of data is being written, then the write field W will be set to indicate a fully updated entry 52 (e.g., W=1); otherwise, the write field is set to indicate that the entry 52 has not been fully updated (e.g., W=0).

As alluded to above, the pseudo RAM manager 46 monitors the entries 52 in the LUT 42. When an entry has a write field W indicating a fully updated data unit in the buffer RAM 44, the pseudo RAM manager 46 instructs the data fill/flush controller 48 to have that data written into the flash memory 6. Specifically, in response to this instruction, the data fill/flush controller 48 sends a write request and associated logical address to the FTL 26, and sends the associated data to the flash memory interface 28. As discussed in detail below, the FTL 26 maps the received logical address into a physical address, which is then supplied to the flash memory interface 28 along with the write request. The flash memory interface 28 then writes the received data into the flash memory 6 using the received physical address.

Flash Translation Layer Unit (FTL) 26

The FTL 26 maps a received logical address into a physical address for read and write operations. With respect to write operations, the mapping operation is performed to mitigate the inefficiencies caused by the need for an erase before write operation with NAND type flash memories such as flash memory 6. Furthermore, the FTL 26 adopts a file system that is the same as used by the host system 2 such that a direct mapping of a logical address to a physical address can occur without the need for translating the logical address received the host system 2. For instance, if the host system uses a file system based on a cluster as the unit of data, then the logical addresses in the FTL 26 are also based on clusters. Therefore, the FTL 26 is designed independent of the physical structure of the flash memory 6.

Figure 8:
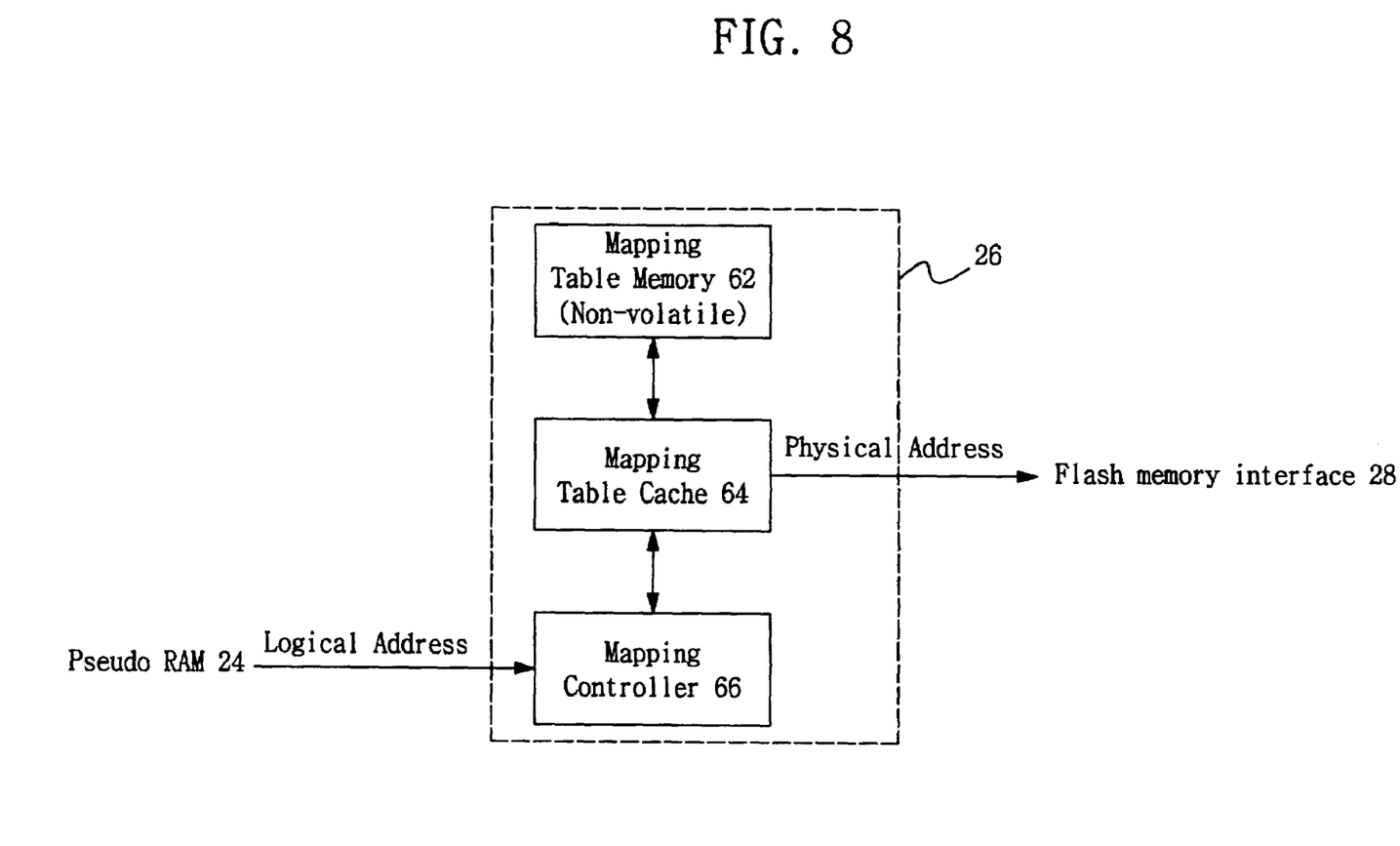
FIG. 8 illustrates the flash translation layer unit (FTL) of FIG. 2 in greater detail.

FIG. 8 illustrates an exemplary embodiment of the FTL 26 according to the present invention. As shown, the FTL 26 includes a mapping table memory 62, which in an exemplary embodiment is non-volatile memory such as a NOR type flash memory. The mapping table memory 62 includes a physical address tables, and a logical address table as will be discussed in greater detail below with respect to FIG. 9. The physical address table is for mapping logical addresses to physical addresses, and the logical address table is for mapping physical addresses to logical addresses.

As further shown in FIG. 8, the FTL 26 includes a mapping table cache 64 which operates as a cache with respect to the mapping table memory 62, and therefore, can provide for greater efficiency in mapping logical and physical addresses to one another. The mapping table memory 62 and mapping table cache 64 are controlled by a mapping controller 66, which receives the read and write requests from the pseudo RAM 24.

Figure 9:
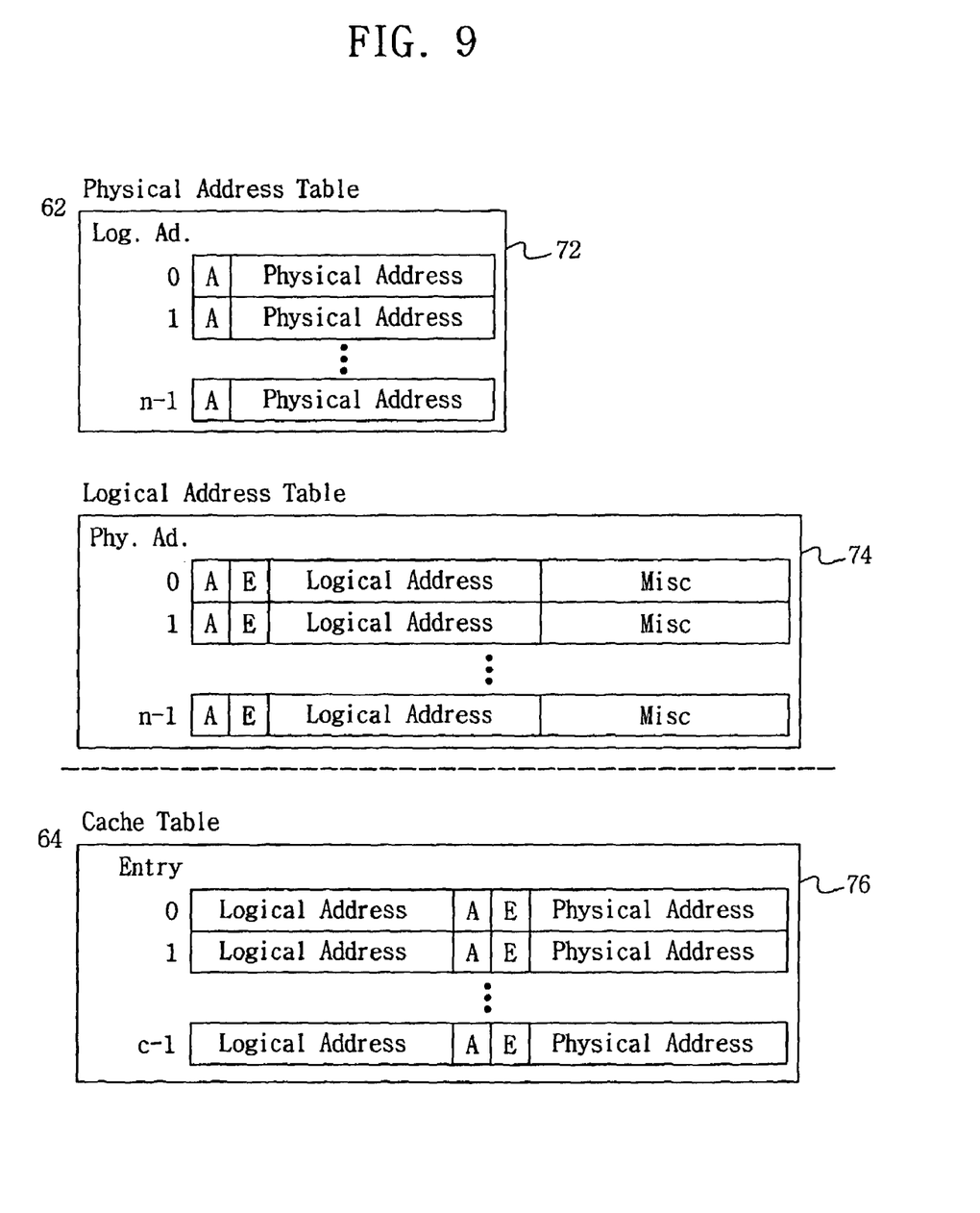
FIG. 9 illustrates the mapping table memory and the mapping table cache of FIG. 8 in greater detail.

FIG. 9 illustrates the mapping table memory 62 and the mapping table cache 64 in greater detail. As shown, the mapping table memory 62 includes a physical address table 72 and a logical address table 74. The physical address table 72 is indexed by the possible logical addresses. In other words, each entry in the physical address table corresponds to one of the possible logical addresses. Each entry associated with the logical address includes an allocation field A, and a physical address field. The allocation field A indicates whether or not a physical address has been associated with the logical address, and the physical address field indicates the associated physical address.

The logical address table 74 is indexed by the possible physical addresses. Namely, each entry in the logical address table 74 corresponds to one of the possible physical addresses in the flash memory 6. Each entry in the logical address table 74 includes an allocation field A, an erase field E, a logical address field, and a miscellaneous field. The allocation field A indicates whether or not a logical address has been associated with the physical address. The erase field E indicates whether or not the associated physical address is currently erased. The logical address field includes the logical address corresponding to the physical address, and the miscellaneous field stores miscellaneous data such as error correction code (ECC) data, etc.

As further shown in FIG. 9, the cache table 76 in the mapping table cache 64 includes a plurality of entries. Each entry includes a logical address field, an allocation field A, an erase field E, and a physical address field. The logical address field includes an access tag of a logical address associated with the physical address in the physical address field. The allocation field A indicates whether or not the association between the logical and physical addresses is valid, and the erase field indicates whether the physical address in the physical address field is currently erased.

Figure 10:
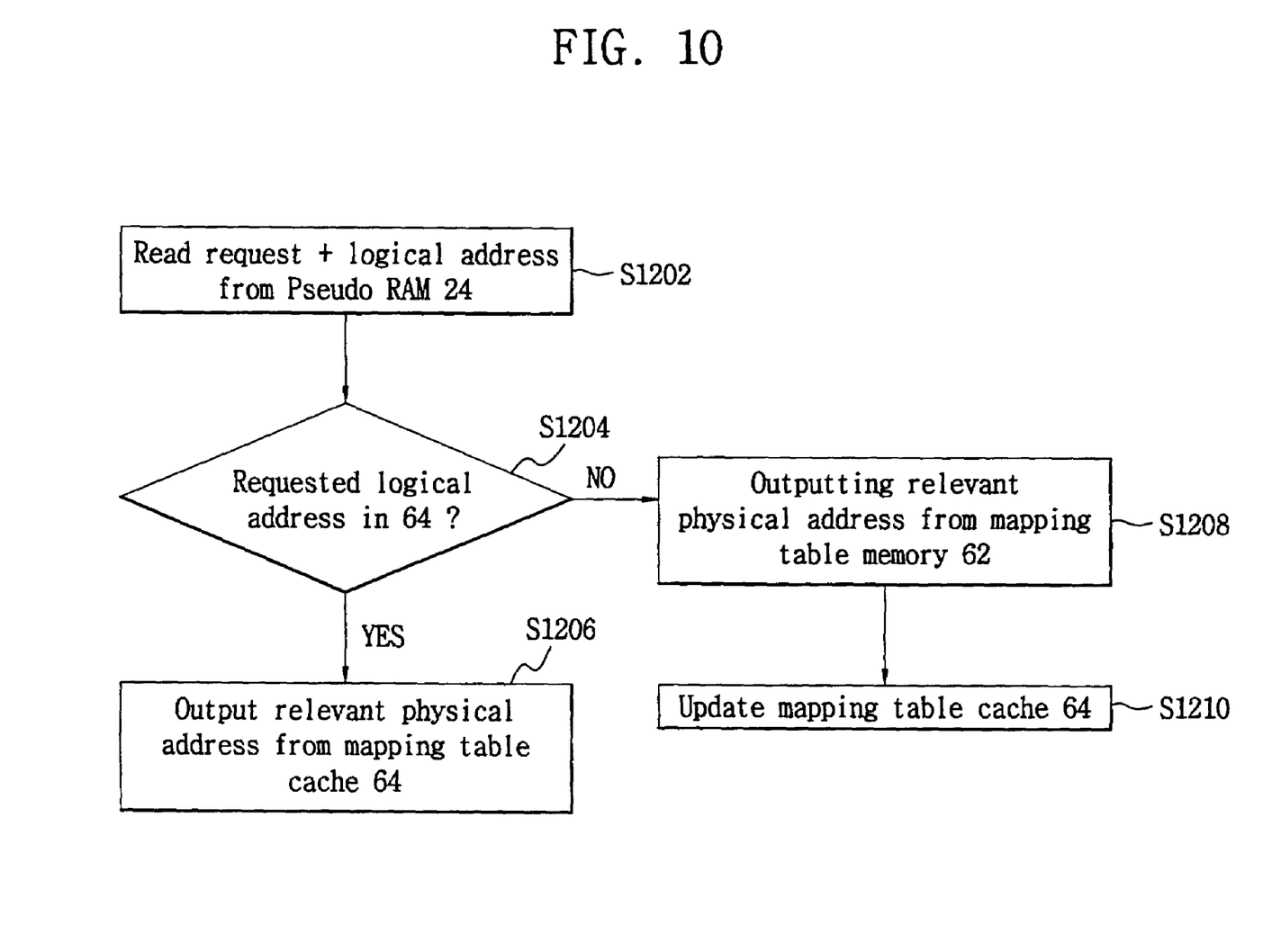
FIG. 10 illustrates a flow chart of the read process performed by the FTL in FIG. 8.

FIG. 10 illustrates the operation of the FTL 26 when a read request is received from the pseudo RAM 24. As shown in step S1202, the mapping controller 66 receives a read request and logical address from the pseudo RAM 24. In response, the mapping controller 66 accesses the mapping table cache 64 and determines whether the cache table 76 includes the tag portion of the received logical address in an entry and whether a valid association exists between the received logical address and a physical address. If a valid association between the received logical address and a physical address exists in the cache table 76, then in step S1206, the mapping controller 66 causes the mapping table cache 64 to output the associated physical address to the flash memory interface 28 along with the read request.

If the received logical address is not associated with a physical address in the cache table 76, then in step S1208, the mapping table cache 64 accesses a physical address associated with the received logical address from the physical address table 72. Namely, using the received logical address as an index, the mapping table cache 64 obtains the associated physical address 72. If for some reason the logical address did not include a valid physical address in association therewith (A=0), this would indicate that no valid data is associated with the received logical address, and an error status is returned by the mapping controller 66 to the pseudo RAM 24, which passes this error onto the host system 2 via the host system interface 22.

In addition to outputting the physical address to the flash memory interface 28, the mapping table cache 64 updates the cache table 76 to include the received logical address and output physical address as an entry in the cache table 76. In doing so, the mapping table cache 64 also accesses the logical address table 74 to obtain the state of the erase indicator E for the associated physical address.

Figure 11:
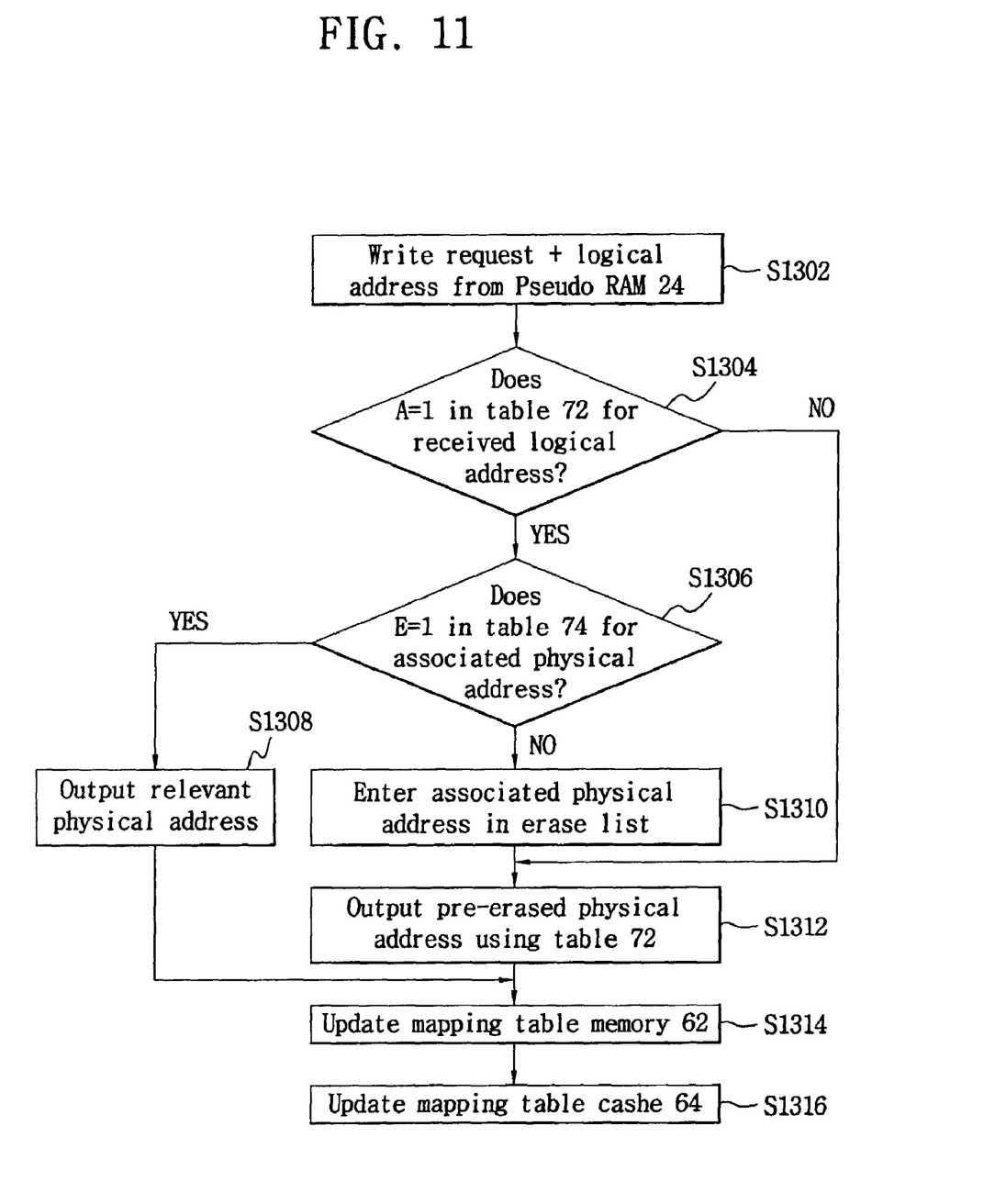
FIG. 11 illustrates a flow chart of the write process performed by the FTL in FIG. 9.

Next, the operation of the FTL 26 with respect a write request received from the pseudo RAM 24 will be described with respect to FIG. 11. As shown, in step S1302, the mapping controller 66 receives a write request, logical address and the relevant data from the pseudo RAM 24. The mapping controller 66 accesses the mapping table 62 through the mapping table cache 64 to determine from the logical address table 72 if the received logical address is associated with a physical address. Namely, using the received logical address as an index, the mapping controller 66 determines if A=1 in the entry associated with the received logical address. If so, then the mapping controller accesses the associated physical address from the physical address table 72, and determines in step S1306 if the portion of the flash memory 6 associated with the retrieved physical address is erased. Specifically, using the retrieved physical address as an index, the mapping controller 66 determines if the erase field E associated with the physical address in the logical address table equals 1. If so, then the above process indicates that the association between logical address and physical address is valid and the physical address is an erase state such that a write operation can be performed. Consequently, in step S1308, the mapping controller 66 instructs the mapping table cache 64 to output the retrieved physical address and the write request to the flash memory interface 28. If the mapping table cache 64 does not have the retrieved physical address, the mapping controller 66 instructs the physical address table 72 to output the retrieved physical address. The mapping controller 66 also updates the mapping table memory 62 in step S1314 and the mapping table cache in step S1316. Specifically, in the logical address table 74, the allocation field is set (e.g., A=1), the erase field E associated with the output physical address is changed to indicate that the physical address is not currently erased, and the received logical address is entered in the logical address field. In the physical address table 72, the allocation field of the received logical address is set and the output physical address is entered in the physical address field. Similar changes are made to the cache table 76 if an entry for the received logical address in association with the physical address exists. If no such entry exists in the cache table 76, then an entry is created.

If in step S1306, E does not equal 1 for the retrieved physical address, this means that the memory location in the flash memory 6 corresponding to the retrieved physical address is not erased. Therefore, data cannot be written into this memory location unless an erase before write operation is performed. Consequently, in step S1310, the mapping controller 66 places the retrieved physical address on an erase list. The erase list is a list of physical addresses that are to be erased. This erasure can occur periodically, or can be event driven, such a when the processing resources and the flash memory 6 are available without affecting read/write efficiency.

Then, in step S1312, the mapping controller 66 accesses the logical address table 74 to find a physical address that is in the erased state. This physical address is output to the flash memory interface 28 with the write request. In steps S1314 and S1316, the mapping controller 66 updates the mapping table memory 62 and the mapping table cache 64. In updating the mapping table memory 62, the physical address table 72 is changed as follows: the allocation field A for the received logical address is set, if not already set, to indicate allocation of the logical address; and the output physical address is entered in the physical address field for the received logical address. In the logical address table 74 the allocation field A for the physical address previously associated with the received logical address is set (A=0) to indicate the physical address is not associated with a logical address. Also, in the logical address table 74, the entry for the output physical address is changed as follows: the allocation field is set (A=1) to indicate allocation, the erase field is set (E=0) to indicate a non-erased state, and the received logical address is entered in the logical address field. In updating the mapping table cache 64, an entry is created for the received logical address and output physical address, or any entry including the logical or physical address is overwritten (or such entries updated to indicate that they are no longer valid).

Returning to step S1304, if A does not equal 1 in physical address table 72 for the received logical address, then no physical address has been allocated to the logical address. As a result, processing proceeds to step S1312, and proceeds from there as described in detail above.

Figure 12:
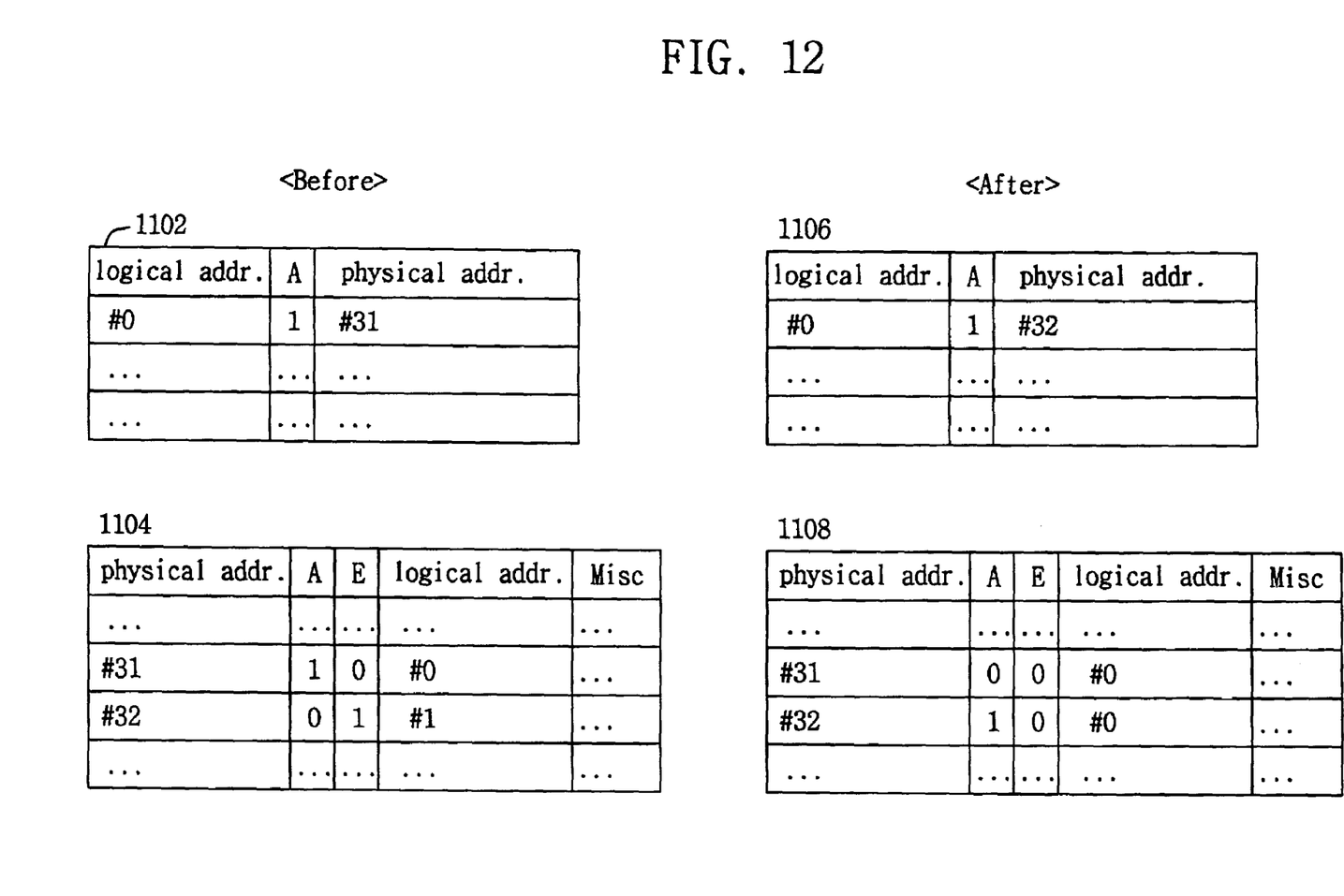
FIG. 12 illustrate portions of the mapping table memory before and after an example write operation.

FIG. 12 illustrates a portion of the physical address table 72 and the logical address table 74 before and after the FTL 26 handles a write request. Specifically, tables 1102 and 1104 in FIG. 12 represent the physical address table 72 and the logical address table 74, respectively, before receipt of a write request, and tables 1106 and 1108 in FIG. 12 respectively show a physical address table 72 and the logical address table 74 after processing the write request. In the example shown in FIG. 12, the write requests is to write new data into logical address #0. Following the process as described above with respect to FIG. 11, in step S 1304 the mapping controller 66 determines that A=1 for a logical address #0 in step S1304 (see Table 1102). Accordingly, in step S1306, the mapping address determines the erase state for the physical address associated with logical address #0. As shown in Table 1102, physical addresses associated with logical address #0 is physical address #31. As shown in Table 1104, the erase state for physical address #31 is 0 indicating that the physical address is not currently erased. Therefore, in step S1308, the mapping controller 66 finds a new physical address that is in an erased state. Referring again to FIG. 12, the mapping controller 66 locates physical address #32 which, as shown in Table 1104, is in the erased state.

Therefore, in step S1308, the physical address output from the mapping table cache 64 or the physical address table 72 is the physical address #32.

In step S1314, the mapping controller 66 updates the mapping table memory 62. As shown in FIG. 12, the physical address table 72 represented by Table 1106 is updated such that the physical address #32 is now associated with the logical address #0. With respect to the logical address table 74 represented by Table 1108, the allocation field A for the physical address #31 is changed to indicate no allocation, the allocation field A for the physical address #32 is changed to indicate that the physical address is allocated, the erase state of the physical address #32 is changed to indicate that the physical address #32 is not an erased state, and the logical address #0 is written in association with the physical address #32.

Flash Memory Interface

Figure 13:
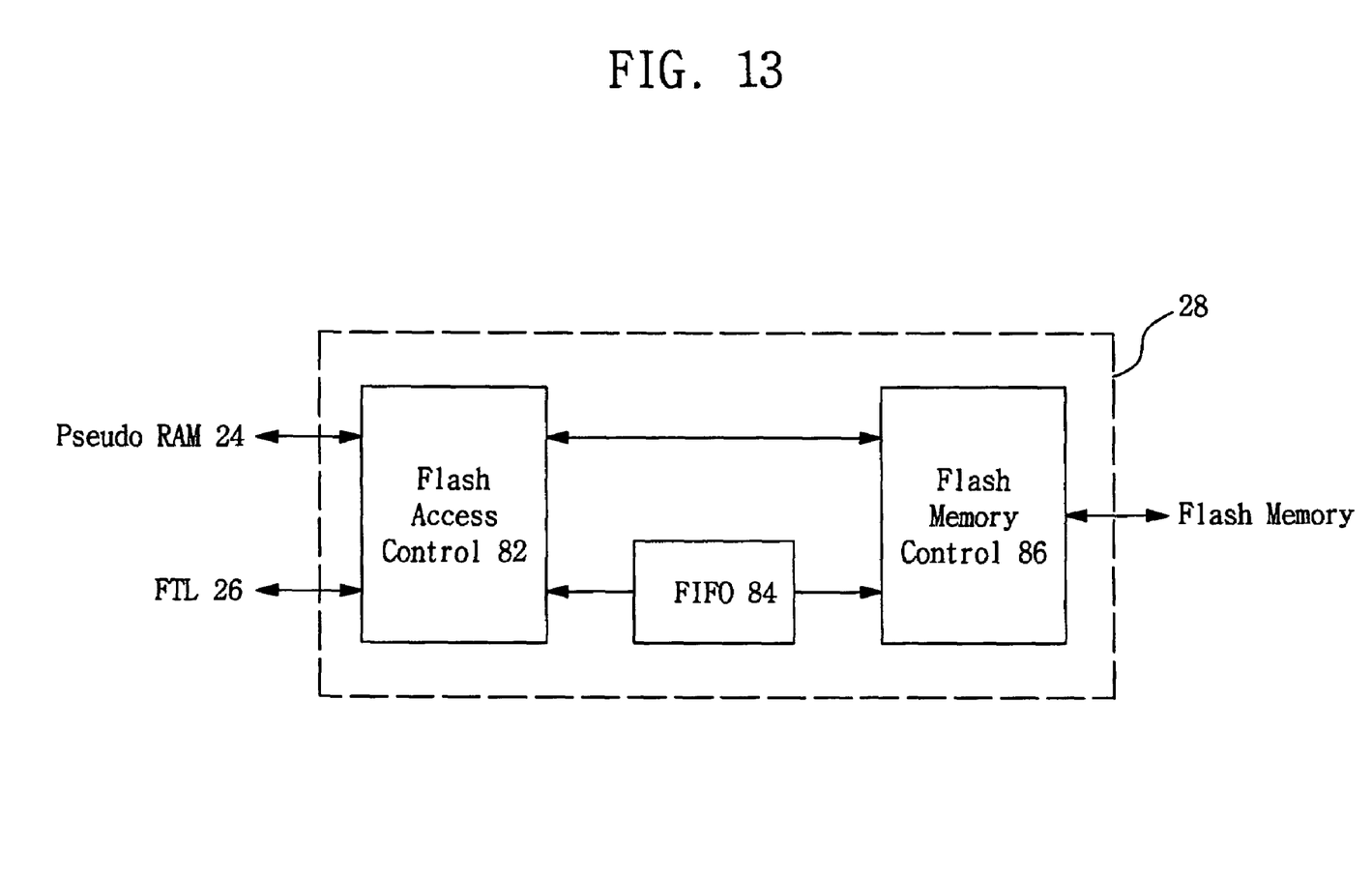
FIG. 13 illustrates the flash memory interface of FIG. 2 in greater detail.

FIG. 13 illustrates the last and lowest layer of the flash memory subsystem 14—the flash memory interface 28. Specifically, as is well known, the flash memory interface 28 performs the functions of directly writing and reading data to/from the flash memory 6.

As shown in FIG. 13, the flash memory interface 28 includes a flash access control 82, which serves as an interface with the upper layers of the flash memory subsystem 14, and a flash memory controller 86 which serves as a direct interface with the flash memory 6. Disposed between the flash access control 82 and the flash memory controller 86 is a data FIFO 84 that stores data being transferred between the flash access control 82 and the flash memory controller 86. In its role as an interface, it is well known that the flash access control 82 handles data and command handshake signals, and includes registers storing, for example, ECC results, previously written ECC values, etc. The write or read request received by the flash access control 82 are directly transferred to the flash memory controller 86, while data received during a write operation is supplied to the flash memory controller 86 via the FIFO 84. In addition, the flash access control 82 supplies the logical address directly to the flash memory controller 86 in association with the read and write request. The flash memory controller 86 generates flash memory control signals to perform the read, program (write), and erase operations. In an exemplary embodiment of the present invention, the flash memory controller 86 is designed to operate in the most efficient manner depending upon the flash memory 6 to which the flash memory subsystem 14 is being connected. Also, to promote efficiency, the FIFO 84 is constructed to have a size of n×bs bits where n is the FIFO depth and bs is the bus size.

Because the structure and operation of the flash memory interface 28 is so well known, further detailed description of the structure and operation of this device will not be provided for the sake of brevity.

As described above, the flash file system according to the present invention has a hierarchical structure that permits redesigning a host system, flash memory or a portion of the flash file system without completely redesigning the flash file system. Accordingly, the flash file system of the present invention is extremely flexible and readily adaptable to specific applications.

Because the cache memory system uses the same file system as the host system, no translation of a logical address received from the host system is required at the cache memory system.

Furthermore, the FTL uses the same file system as the host system. Consequently, in mapping a logical address received by the host system into a physical address of the flash memory, the FTL does not need to translate the logical address of the host system from one mapping format or file system into another. More specifically, the file system and mapping format of the flash memory subsystem 14 is based on the same data unit size as the file system and mapping format of the host system. Accordingly, the mapping format is independent of a physical structure of the flash memory 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A flash file system, comprising:
   a flash memory; and
   a subsystem interfacing between the flash memory and a host system, the subsystem including,
   a host system interface interfacing with the host system;
   a cache memory system, the cache memory system having a storage capacity of a number of data units, and storing data for transfer to and from the host system via the host system interface based on logical addresses received from the host system via the host system interface, the data being stored in association with the logical addresses;
   a flash translation layer unit mapping a logical address received from the cache memory into a physical address of the flash memory; and
   a flash memory interface interfacing with the flash memory to transfer data to the flash memory from the cache memory system based on the physical address received from the flash translation layer unit and to transfer data from the flash memory to the cache memory system based on the physical address received from the flash translation layer unit.

2. The flash file system of claim 1, wherein the subsystem has a mapping format that is independent of a physical structure of the flash memory.

3. The flash file system of claim 1, wherein the mapping format is a same size as a data transfer unit of the host system.

4. The flash file system of claim 3, wherein the mapping format has a cluster size of the host system.

5. The flash file system of claim 4, wherein the mapping format has a size of 4 KB.

6. The flash file system of claim 1, wherein the cache memory system outputs data for transfer to the host system without accessing the flash memory when data requested by the host system is resident in the cache memory system.

7. The flash file system of claim 6, wherein the cache memory system comprises:
   a buffer memory having the storage capacity of a number of data transfer units; and
   a look up table memory having an entry associated with each data unit in the buffer memory, each entry indicating a logical address of the associated data unit and whether the data in the data unit is valid.

8. The flash file system of claim 7, wherein each of the entries further indicates which portions of data in the data unit include data changed by the host system.

9. The flash file system of claim 7, wherein each of the entries further indicates whether the entire data unit includes data changed by the host system.

10. The flash file system of claim 1, wherein the flash translation layer unit stores a physical address table and a logical address table; the physical address table being indexed by logical addresses, indicating an associated physical address for each logical address, and indicating whether the logical address and physical address association is valid; the logical address table being indexed by physical addresses, indicating an associated logical address for each physical address, indicating whether the physical address and logical address association is valid, and indicating for each physical address whether this portion of the flash memory is erased.

11. The flash file system of claim 10, wherein the logical address table further includes a miscellaneous field associated with each physical address index that includes at least error correction code data.

12. The flash file system of claim 10, wherein the flash translation layer unit further stores a mapping table cache, each entry in the mapping table cache including a logical address for a data unit of data, a physical address associated with the data unit of data, a validity indicator indicating whether the logical address and physical address association is valid, and a erasure indicator indicating whether a portion of the flash memory associated with the physical address is erased.

13. A flash file system, comprising:
   a flash memory; and
   a subsystem interfacing between the flash memory and a host system, the subsystem including a cache memory system, the cache memory system storing data for transfer to the flash memory according to logical addresses used by the host system and outputting data for transfer to the host system without accessing the flash memory when data requested by the host system is resident in the cache memory system, the data being stored in association with the logical addresses.

14. The flash file system of claim 13, wherein the cache memory system comprises:
   a buffer memory having a storage capacity of a predetermined number of data units;
   a look up table memory having an entry associated with each data unit in the buffer memory, each entry indicating a logical address of the associated data unit and whether the data in the data unit is valid.

15. The flash file system of claim 14, wherein each of the entries further indicates which portions of data in the data unit include data changed by the host system.

16. The flash file system of claim 14, wherein each of the entries further indicates whether the entire data unit includes data changed by the host system.

17. A flash file system, comprising:
   a flash memory; and
   a subsystem interfacing between the flash memory and a host system, the subsystem including,
   a flash translation layer unit mapping a logical address received from the host system into a physical address of the flash memory, the flash translation layer unit storing a physical address table and a logical address table; the physical address table being indexed by logical addresses, indicating an associated physical address for each logical address, and indicating whether the logical address and physical address association is valid; the logical address table being indexed by physical addresses, indicating an associated logical address for each physical address, indicating whether the physical address and logical address association is valid, and indicating for each physical address whether this portion of the flash memory is erased.

18. The flash file system of claim 17, wherein the logical address table further includes a miscellaneous field associated with each physical address index that includes at least error correction code data.

19. The flash file system of claim 17, wherein the flash translation layer unit further stores a mapping table cache, each entry in the mapping table cache including a logical address for a data unit of data, a physical address associated with the data transfer unit of data, a validity indicator indicating whether the logical address and physical address association is valid, and a erasure indicator indicating whether a portion of the flash memory associated with the physical address is erased.

20. A flash filing method for a flash memory, comprising:
storing data for transfer to and from a host system in a cache memory system based on a logical address received from the host system, the cache memory system having a storage capacity of a number of data units, and storing the data for transfer in association with the logical addresses;
mapping a logical address received from the cache memory into a physical address of the flash memory; and
interfacing with the flash memory to transfer data to the flash memory from the cache memory system based on the physical address received from the mapping step in a write mode and to transfer data from the flash memory to the cache memory system based on the physical address received from the mapping step in a read mode.

21. The method of claim 20, wherein a mapping format used in the mapping step is independent of a physical structure of the flash memory.

22. The method of claim 20, wherein a mapping format used in the mapping step is a same size as a data transfer unit of the host system.

23. The method of claim 22, wherein the mapping format has a cluster size of the host system.

24. The method of claim 20, further comprising:
outputting data for transfer to the host system without accessing the flash memory when data requested by the host system is resident in the cache memory system.

25. The method of claim 20, further comprising:
storing a physical address table and a logical address table; the physical address table being indexed by logical addresses, indicating an associated physical address for each logical address, and indicating whether the logical address and physical address association is valid; the logical address table being indexed by physical addresses, indicating an associated logical address for each physical address, indicating whether the physical address and logical address association is valid, and indicating for each physical address whether this portion of the flash memory is erased; and wherein
the mapping step performs the mapping operation based on the physical and logical address tables.

26. The method of claim 25, further comprising:
storing a mapping table cache, each entry in the mapping table cache including a logical address for a data unit of data, a physical address associated with the data unit of data, a validity indicator indicating whether the logical address and physical address association is valid, and a erasure indicator indicating whether a portion of the flash memory associated with the physical address is erased; and wherein
the mapping step performs the mapping operation based on the physical address table, logical address table and the mapping table cache.

27. A flash file method for a flash memory, comprising:
storing data for transfer to the flash memory in a cache memory system according to logical addresses used by a host system, the data being stored in association with the logical addresses; and
outputting data for transfer to the host system without accessing the flash memory when data requested by the host system is resident in the cache memory system.

28. The method of claim 27, wherein
the storing step stores data for transfer to the flash memory in a buffer memory of the cache memory system, the buffer memory having a storage capacity of a predetermined number of data units; and wherein
the outputting step accesses a look up table memory having an entry associated with each data unit in the buffer memory to output data for transfer to the host system from the buffer memory, each entry indicating a logical address of the associated data unit and whether the data in the data unit is valid.

29. A flash filing method for a flash memory, comprising:
storing a physical address table and a logical address table; the physical address table being indexed by logical addresses, indicating an associated physical address for each logical address, and indicating whether the logical address and physical address association is valid; the logical address table being indexed by physical addresses, indicating an associated logical address for each physical address, indicating whether the physical address and logical address association is valid, and indicating for each physical address whether this portion of the flash memory is erased; and wherein
mapping a logical address received from the host system into a physical address of the flash memory based on the physical and logical address tables.

30. The method of claim 29, further comprising:
storing a mapping table cache, each entry in the mapping table cache including a logical address for a data unit of data, a physical address associated with the data unit of data, a validity indicator indicating whether the logical address and physical address association is valid, and a erasure indicator indicating whether a portion of the flash memory associated with the physical address is erased; and wherein
the mapping step performs the mapping operation based on the physical address table, logical address table and the mapping table cache.

* * * * *